United States Patent
Hansson et al.

(10) Patent No.: US 8,636,021 B2
(45) Date of Patent: Jan. 28, 2014

(54) NON-MAGNETIC LATCHING SERVO ACTUATED VALVE

(75) Inventors: Mark G. Hansson, St. Petersburg, FL (US); Byron K. Steiff, Bradenton, FL (US); David Fordham, Seminole, FL (US); Donald Blackman, Bradenton, FL (US); Paul Schamell, Bradenton, FL (US); Tom Yandle, Palmetto, FL (US)

(73) Assignee: Carleton Technologies, Inc., Orchard Park, NY (US)

( * ) Notice: Subject to any disclaimer, the term of this patent is extended or adjusted under 35 U.S.C. 154(b) by 648 days.

(21) Appl. No.: 12/758,420

(22) Filed: Apr. 12, 2010
(Under 37 CFR 1.47)

(65) Prior Publication Data
US 2011/0180165 A1 Jul. 28, 2011

Related U.S. Application Data

(63) Continuation-in-part of application No. 11/175,454, filed on Jul. 6, 2005, now Pat. No. 7,694,692.

(60) Provisional application No. 60/586,320, filed on Jul. 8, 2004.

(51) Int. Cl.
*F17D 3/00* (2006.01)

(52) U.S. Cl.
USPC .............. 137/1; 137/614.17; 137/614.18; 251/264

(58) Field of Classification Search
USPC ........... 137/614.17, 614.18, 614.2, 614.16, 137/554; 251/264
See application file for complete search history.

(56) References Cited

U.S. PATENT DOCUMENTS

| | | | | |
|---|---|---|---|---|
| 629,561 | A | | 7/1899 | Harrison |
| 1,372,915 | A | | 3/1921 | Smith |
| 2,164,548 | A | * | 7/1939 | Smoot ................. 137/487.5 |
| 2,752,946 | A | | 7/1956 | Maurice et al. |
| 4,593,881 | A | | 6/1986 | Yoshino |
| 4,712,071 | A | * | 12/1987 | Charbonneau et al. ....... 137/554 |
| 4,816,987 | A | * | 3/1989 | Brooks et al. .............. 137/487.5 |
| 5,029,597 | A | | 7/1991 | Leon |
| 5,038,821 | A | * | 8/1991 | Maget .......................... 137/486 |
| 5,137,257 | A | | 8/1992 | Tice |
| 5,152,308 | A | * | 10/1992 | Koch ................................ 137/1 |
| 5,549,137 | A | * | 8/1996 | Lenz et al. .................. 137/486 |
| 5,699,825 | A | | 12/1997 | Norton |
| 5,704,382 | A | * | 1/1998 | Hoffmann et al. ......... 137/487.5 |
| 6,629,411 | B2 | * | 10/2003 | Buscher et al. .......... 137/115.25 |
| 8,292,262 | B2 | * | 10/2012 | Hasunuma et al. ........ 137/513.3 |

FOREIGN PATENT DOCUMENTS

JP 62028589 2/1987
JP S60-165980 2/1987

* cited by examiner

*Primary Examiner* — Craig Schneider
*Assistant Examiner* — Craig J Price
(74) *Attorney, Agent, or Firm* — Jaeckle Fleischmann & Mugel, LLP

(57) ABSTRACT

A non-magnetic latching servo actuated valve under the control of a controller comprising a motor in rotational communication with a lead screw. The lead screw advances or retracts a valve stem connected to a valve stem cap. The valve stem cap has a valve stem cap passage. A valve end cap having a valve seat is provided and receives the valve stem cap such that the valve stem cap can contact the valve seat. A pressure relief device or shuttle assembly is positioned internal to the valve stem cap. The shuttle assembly is used for venting build-up downstream pressure through the non-magnetic latching servo actuated valve outlet, through the valve stem cap passage, around the shuttle assembly, through passages, into a pressure chamber, and to the nonmagnetic latching servo actuated valve exit where the fluid vents until the system is in balance.

5 Claims, 12 Drawing Sheets

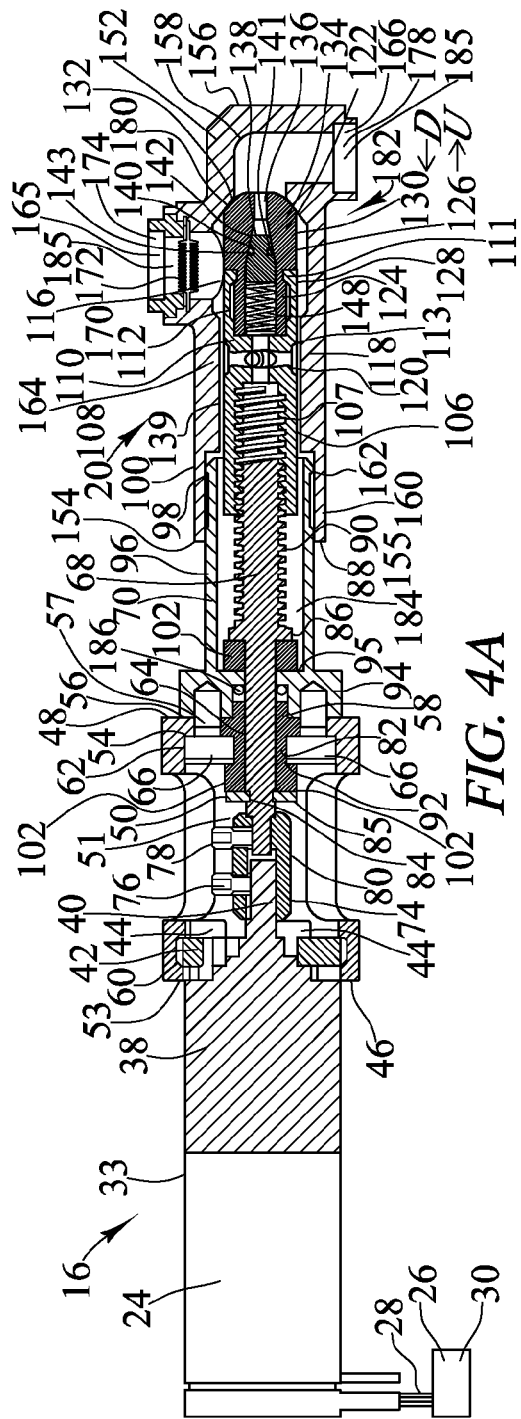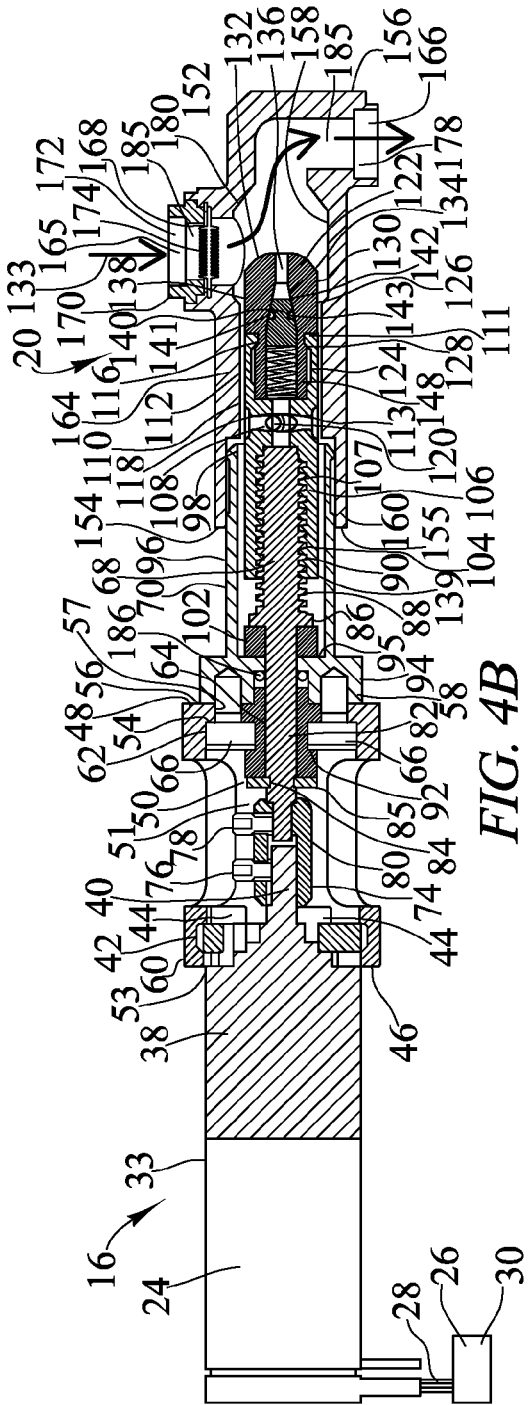
*FIG. 4A*
*FIG. 4B*

NON-MAGNETIC LATCHING SERVO ACTUATED VALVE

CROSS REFERENCE TO RELATED APPLICATION

This application claims benefit of U.S. Provisional Application No. 60/586,320, filed on Jul. 8, 2004 and entitled "Non-magnetic Servo Actuated Valve." This application also claims benefit of co-pending application Ser. No. 11/175,454, filed on Jul. 6, 2005, and entitled "Non-magnetic Servo Actuated Valve." The contents of both applications are fully incorporated herein.

FIELD OF THE INVENTION

The present invention relates to a linear control device, and more particularly, to a device for controlling a latch valve.

BACKGROUND

The current industry standard in satellite latch valves calls for the use of solenoids and magnets to hold the valve in either the open or closed position. The use of solenoids and magnets presents a number of inherent problems in satellite applications. One problem is the large amount of power required and consumed to overpower the latching mechanism and reverse the position of the valve. Such large power consumption is especially undesirable in satellite applications, because electrical power is limited. Another problem associated with latch valves that use solenoids and magnets is the magnetic field output of the latch valve due to possible effects of the satellite operation.

In addition, a permanent magnet is typically used in solenoid valves to allow these devices to open and close and remain in a desired set position. A permanent magnet is undesirable in satellite applications because satellite guidance systems use magnetic sensors to determine the position of the satellite. The relatively large problematic magnetic fields produced by the use of the latch valve(s) must be accounted for when calibrating the guidance systems of the satellite.

Current latch valves are also heavy, often weighing in excess of 5 pounds. This extra weight greatly increases the cost of getting the associated satellite into orbit.

Present latch valve are often susceptible to defects and/or malfunctions after a large number of cycles.

There is a need in the art for an apparatus that overcomes the above-described problems associated with the use of servo latch valves that have solenoids and magnets.

SUMMARY OF THE INVENTION

The above-described problems are solved by the new non-magnetic latching servo actuated valve of this invention. The non-magnetic latching servo actuated valve can replace magnetic latch valves that are currently used in satellite and other applications. This advantageously reduces magnetic field problems, because no magnetic field generating solenoid is needed.

The non-magnetic latching servo actuated valve uses a direct current (hereinafter DC) servomotor and a lead screw assembly to rotate and thus shuttle a valve stem and valve stem cap toward and away from a valve end cap to open and close the valve. The lead screw assembly advantageously eliminates the need to use power to maintain the nonmagnetic latching servo actuated valve in either the open position or the closed position. The lead screw cannot be forced to move by applying axial pressure.

The non-magnetic latching servo actuated valve comprises a valve end cap having a valve seat and an inlet and an outlet. It has an internal valve stem that connects to a valve stem cap having a valve stem cap passage which leads to a hollow valve stem cap portion. The valve stem is advanced or retracted by the rotation of the lead screw. A unique shuttle assembly is positioned inside the hollow valve stem cap portion such that the shuttle assembly moves in response to a pressure differential between the inlet and the outlet. In particular, the shuttle assembly can advantageously vent built-up downstream pressure through the valve outlet, through the valve stem cap passage, around the shuttle assembly, into a network of passages, and through the valve inlet where this higher gas pressure exits back to the system gas reservoir. This venting continues until the pressure differential between the inlet and outlet equalizes. This venting is, for example, of particular importance in satellite applications where the fuel vapor pressure can increase substantially due to solar heating of fuel in closed fuel lines. In addition, this pressure relief shuttle assembly is eliminated in applications where the non-magnetic latching servo actuated valve functions as a pressure regulator.

In addition, the servomotor provides precise control of the valve stem and permits the non-magnetic latching servo actuated valve to adapt or "learn" the closed position. That is, as the non-magnetic latching servo actuated valve is actuated, the closed position can, over time, move forward or advance in a direction towards the valve seat of the valve end cap, due to the repetitive forces applied to the valve seat caused by the closing of the non-magnetic latching servo actuated valve.

The servomotor provides for additional stroke to insure that proper closing and sealing of the nonmagnetic latching servo actuated valve is achieved. This is advantageously accomplished by design, since the unit is current limited, that is, the unit stroke is completed when the preset current limiter reaches the pre-set value.

In one of the preferred embodiments, the non-magnetic latching servo actuated valve can be used in high-pressure applications, for example applications where pressure can exceed 4800 pounds per square inch (hereinafter p.s.i.), and can be used in applications that use substances and fluids that are highly corrosive. As a result, no form of soft seal is used. The substances can include hydrazine and/or other rocket fuels that are highly corrosive. Any soft seal material would be eroded by these corrosive fuels being used in these systems or would flow through such soft seals under the high pressures being applied. The present non-magnetic latching servo actuated valve advantageously overcomes these problems by creating seals on both ends of the pressure chamber that will not be degraded by corrosive or volatile materials.

The end seal geometry is such that when the non-magnetic latching servo actuated valve is in the closed position, it forms an extremely tight seal. Ideally, the seal is tight enough to allow for minimal leakage, generally $1.0 \times 10^{-6}$ cubic centimeters per second or less. In addition, there is a shaft seal where the rotating lead screw enters the pressure chamber. This axial shaft seal is made of similar corrosive resistant material as the end seal and is thus impervious to the corrosive and volatile materials used in satellites as fuels.

While not used or required for this particular satellite application, there is an additional advantage of using this non-magnetic latching servo actuated valve method of control. Since the non-magnetic latching servo actuated valve system allows for precise control of the position of the valve stem within the valve seat, the non-magnetic latching servo actuated valve can also be used as a pressure regulating valve.

Additionally, the non-magnetic latching servo actuated valve addresses operational power requirement and advantageously reduces the magnetic field effects to nearly zero.

BRIEF DESCRIPTION OF THE FIGURES

This invention is illustrated in the drawings in which like reference numbers designate the same or similar parts.

FIG. 4A is a sectional view of the non-magnetic latching servo actuated valve taken along cut line 4A-4A of FIG. 2 with the non-magnetic latching servo actuated valve in a closed position.

FIG. 4B is a sectional view of the non-magnetic latching servo actuated valve taken along cut line 4A-4A of FIG. 2 with the non-magnetic latching servo actuated valve in an opened position.

DETAILED DESCRIPTION

Figures 9A, 9B:
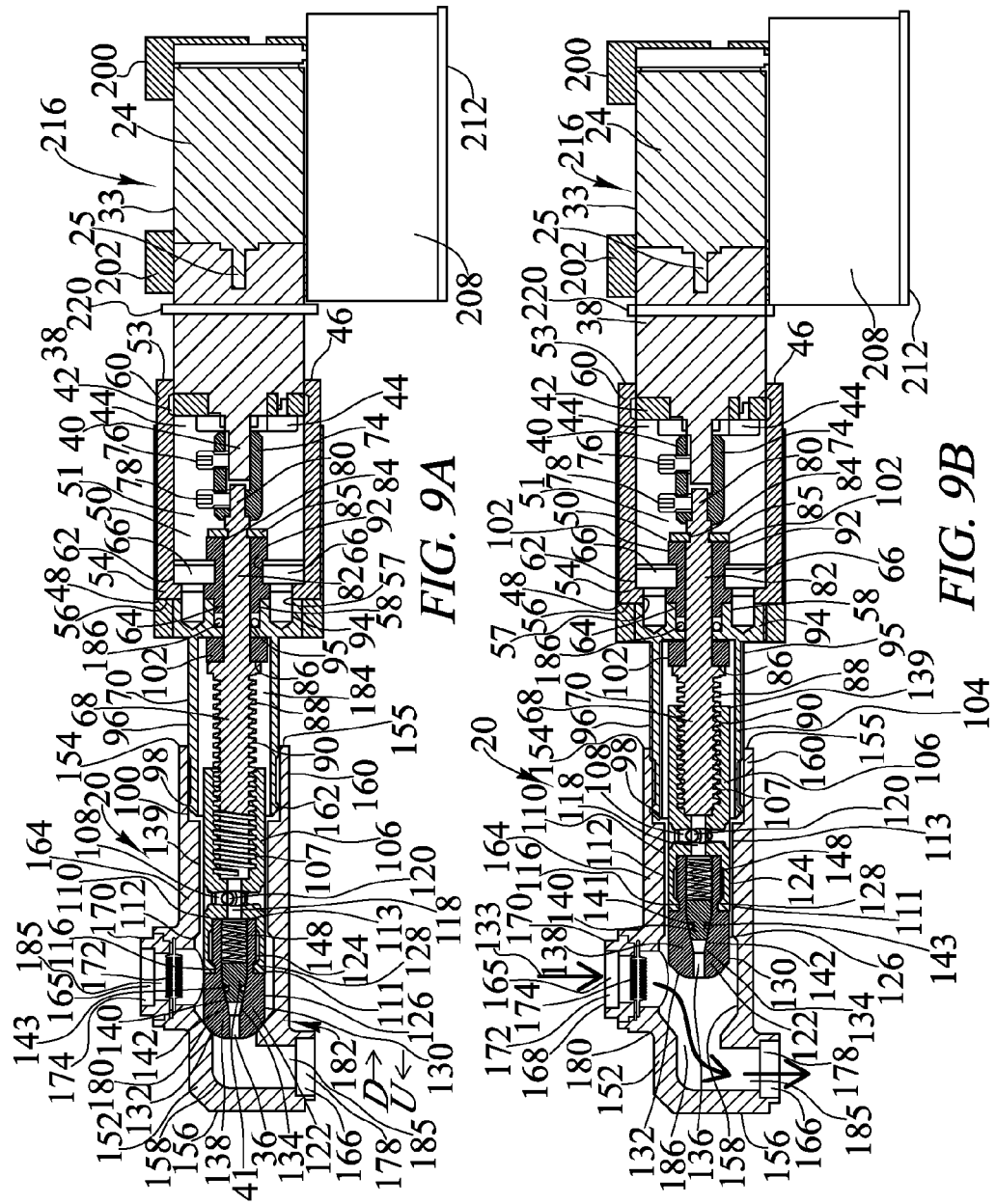
FIG. 9A is a sectional view of the non-magnetic latching servo actuated valve taken along cut line 9A-9A of FIG. 6 with the non-magnetic latching servo actuated valve in a closed position.
FIG. 9B is a sectional view of the non-magnetic latching servo actuated valve taken along cut line 9A-9A of FIG. 6 with the non-magnetic latching. servo actuated valve in an opened position.
Figure 9C:
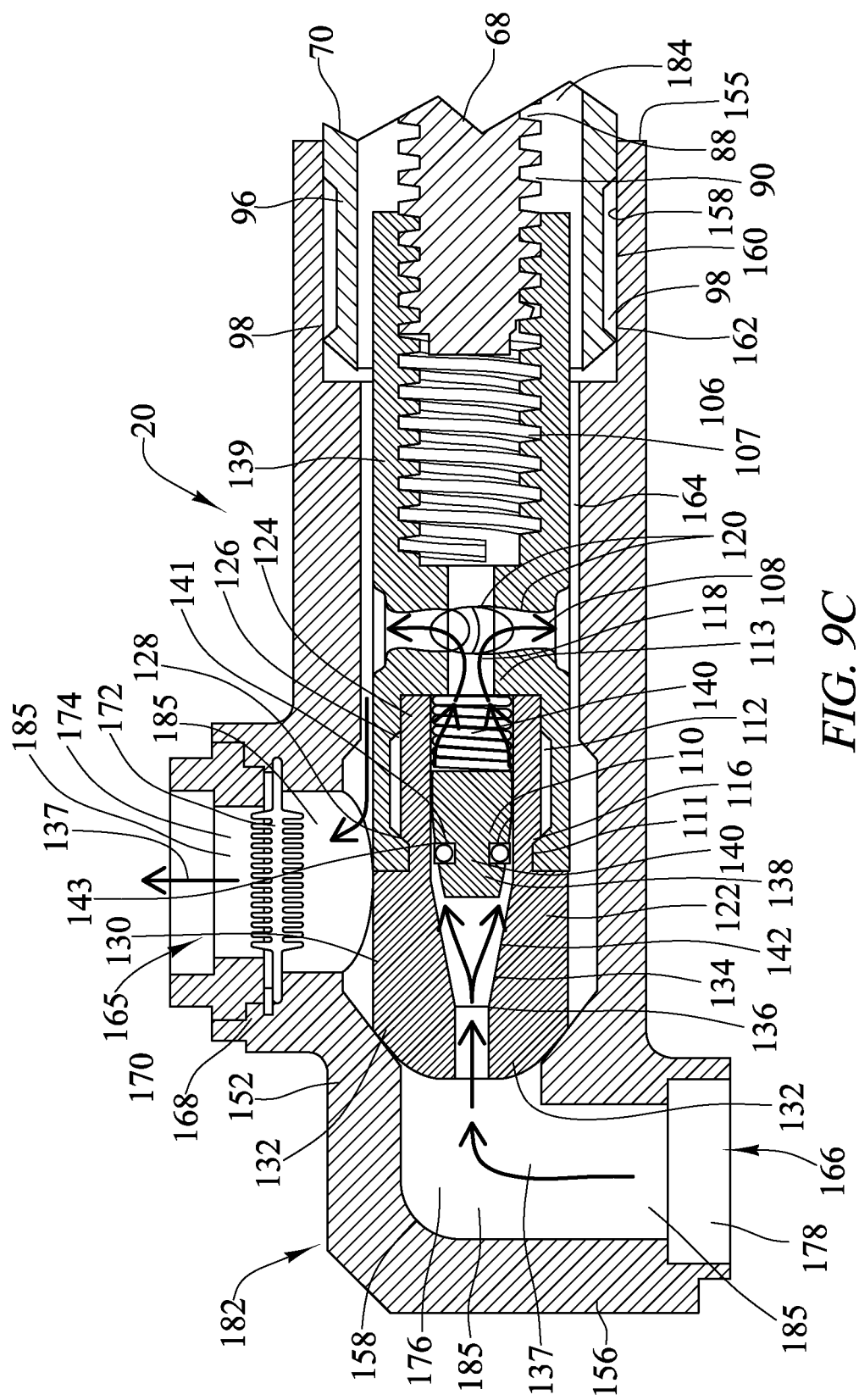
FIG. 9C is an enlarged sectional view of a portion of the non-magnetic latching servo actuated valve taken 15 along cut line 9A-9A of FIG. 6 with the non-magnetic latching servo actuated valve in the closed position and a shuttle bypass in the opened position.

One of the preferred embodiments of the non-magnetic servo actuated latch valve 16 of this invention is shown in FIGS. 1-3 and 4A-4C. The non-magnetic latching servo actuated valve 16 comprises a valve portion that is connected to a direct current (hereinafter DC) motor 24 from which extends a drive shaft 25 (as shown in FIGS. 9A). A wire 28 provides for electric communication between the servo drive/controller 26 and the motor 24. The servo drive/controller 26 provides electronic output to the motor 24. The servo drive/controller 26 has control circuitry 30 in the form of a printed circuit board 32 for controlling the speed of the motor 24.

Figure 2:
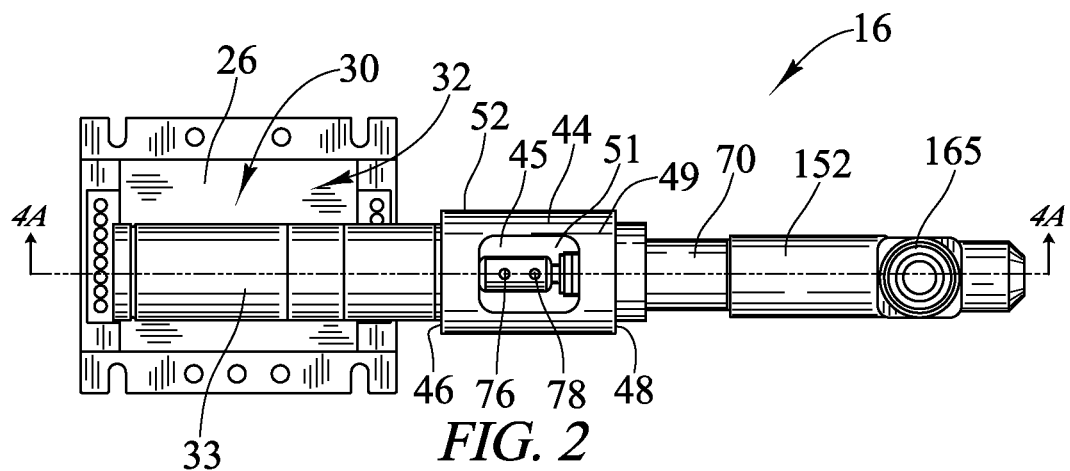
FIG. 2 is a front elevational view of the non-magnetic latching servo actuated valve.
Figure 3:
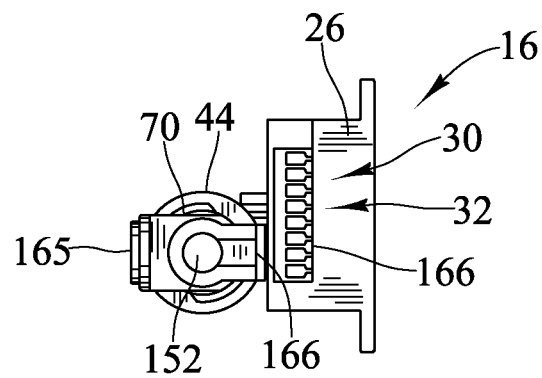
FIG. 3 is a right side elevational view of the non-magnetic latching servo actuated valve.

As shown in FIG. 4A, which is a sectional view taken along cut line 4A-4A of FIG. 2, the non-magnetic latching servo actuated valve 16 includes a housing 33 for the motor 24 and a gear head 38 that can be formed from two covers each of which has a generally semicircular cross section. As will be described presently, the motor 24 is linked to and controllably moves a valve stem cap 122, positioned in the valve portion 20, between open and closed positions.

Figure 4C:
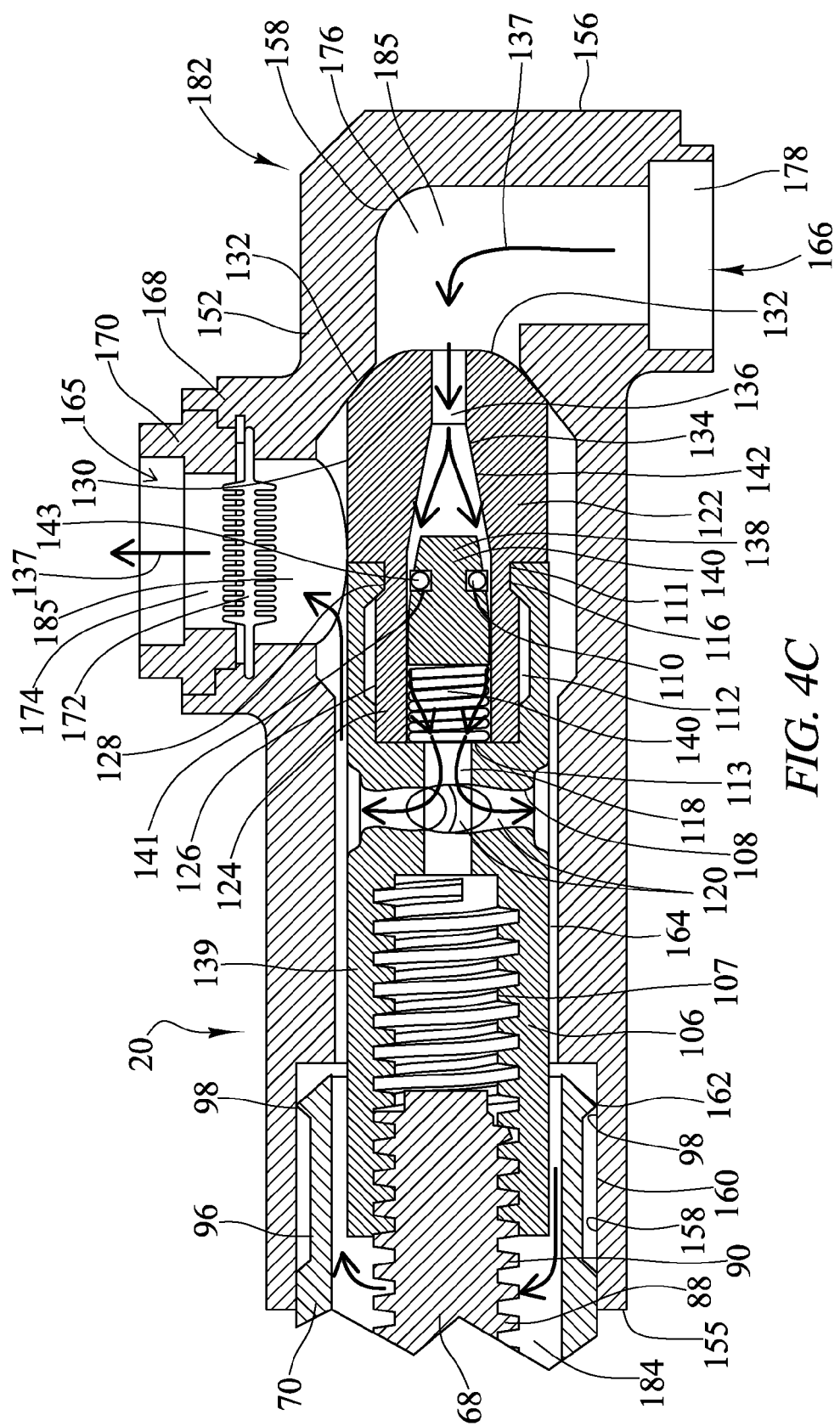
FIG. 4C is an enlarged sectional view of a portion of the non-magnetic latching servo actuated valve taken along cut line 4A-4A of FIG. 2 with the non-magnetic latching servo actuated valve in the closed position and a shuttle bypass assembly in the opened position.
Figure 5:
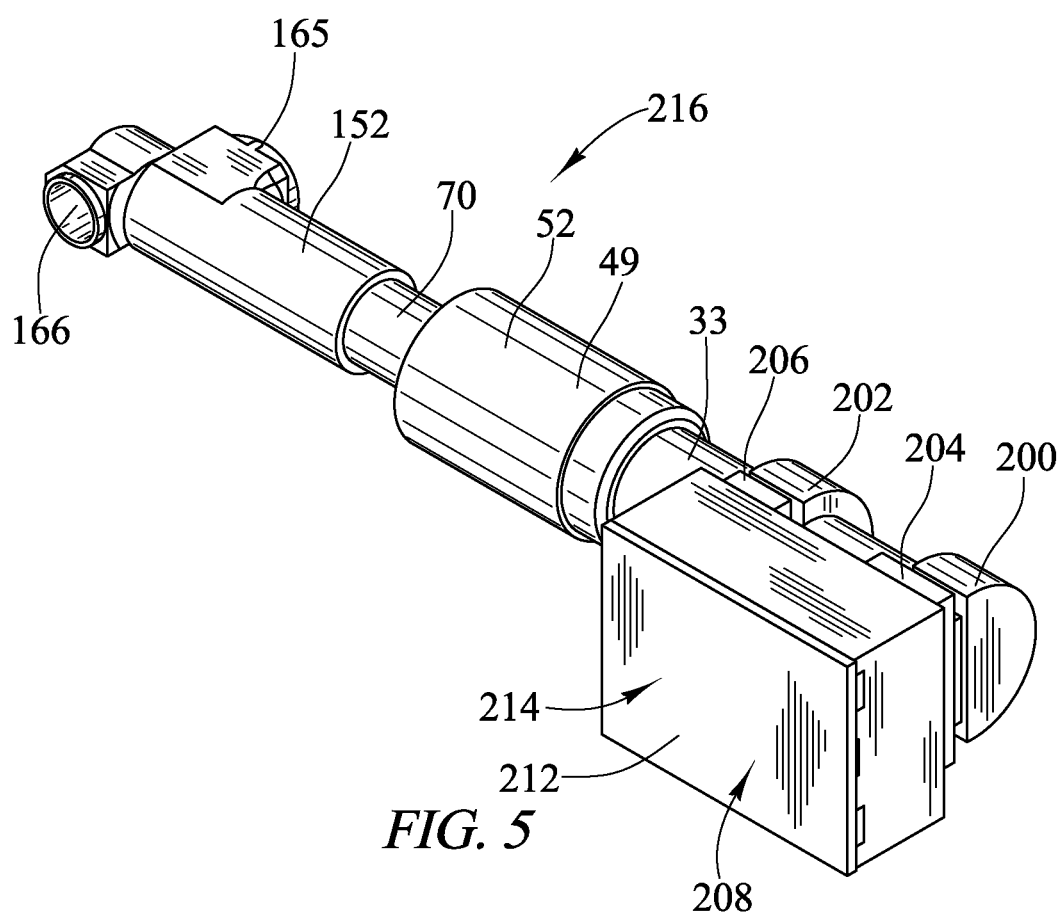
FIG. 5 is a rear perspective view of the nonmagnetic latching servo actuated valve.
Figure 6:
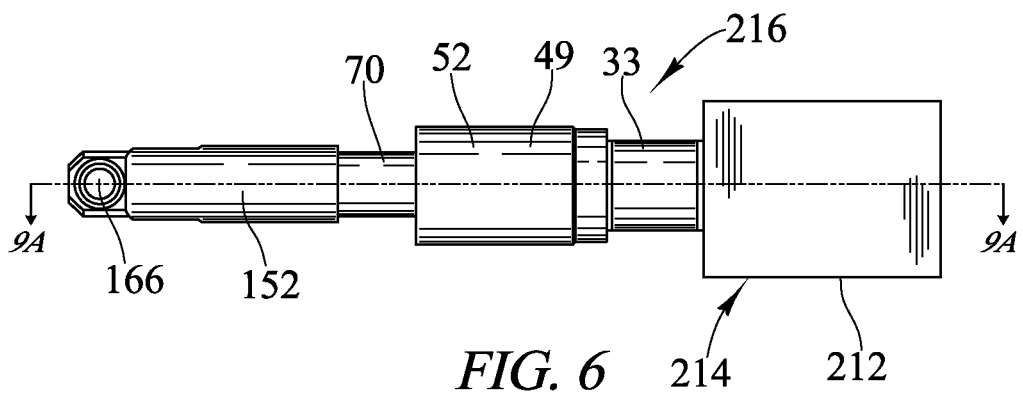
FIG. 6 is a left side view of the non-magnetic latching servo actuated valve.
Figure 7:
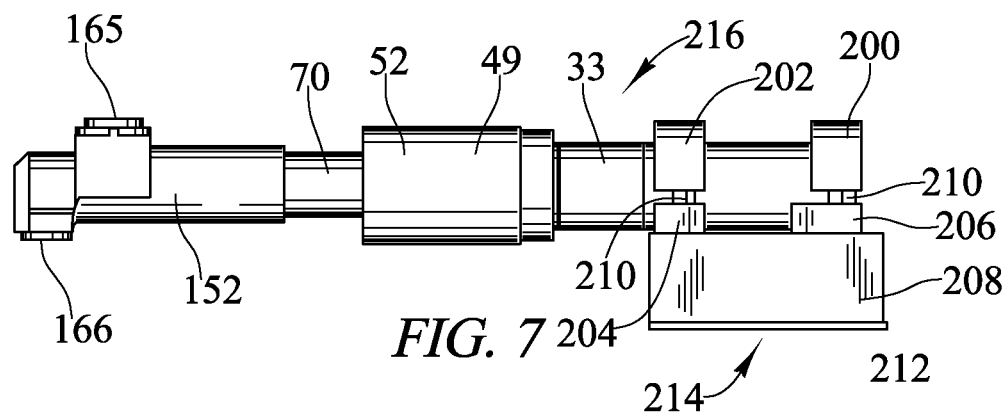
FIG. 7 is a top plan view of the non-magnetic latching servo actuated valve.
Figure 8:
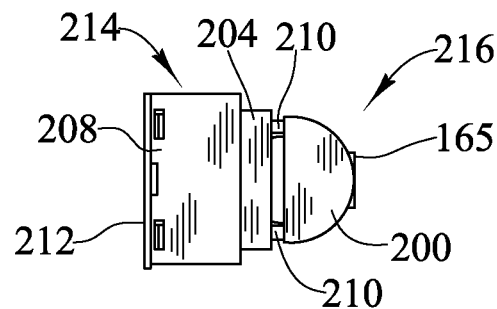
FIG. 8 is an end view of the non-magnetic latching servo actuated valve.

As shown in FIGS. 4A-4C positioned inside the housing 33 is the DC electric motor 24 which is connected to a gear head 38. The gear head 38 imparts rotational motion from the motor shaft 25 to the gear head 38, which outputs the rotational motion to a load shaft 40. A motor mount 42 is positioned inside the housing 33 adjacent the gear head 38, and cap screws connect the gear head 38 and the motor mount 42. The servo controller 26, motor 24 and gear head 38 are well known to those having ordinary skill in the art, and these components are commercially available from MicroMo Electronics, Inc., 14881 Evergreen Ave., Clearwater, Fla. 33762-3008; phone: 800-807-9166 or 727-572-0131; fax: 727-573-5918; e-mail info@micromo.com.

A variety of lubricants can be used within the housing 33. However, for spaced based applications, a lubricant that can withstand extremely low temperatures is preferred. One suitable lubricant is Castrol Braycote® 600 EF, which is manufactured by Castrol Industrial North America, Inc. of Naperville, Ill. Castrol Braycote® is preferred due to it ability to provide effective lubrication at temperatures as low as −73° C. Spaced based applications may also require the use of one or more flexible band heaters 220 that are wrapped around the housing 33 and/or gear head (note FIGS. 9A-9B). Heaters 220 are powered by a source of electrical power via an associated lead (not shown). Suitable band heaters are manufactured by Methode Development Company of Chicago, Ill. Other types of flexible heaters may also suffice.

Figure 1:
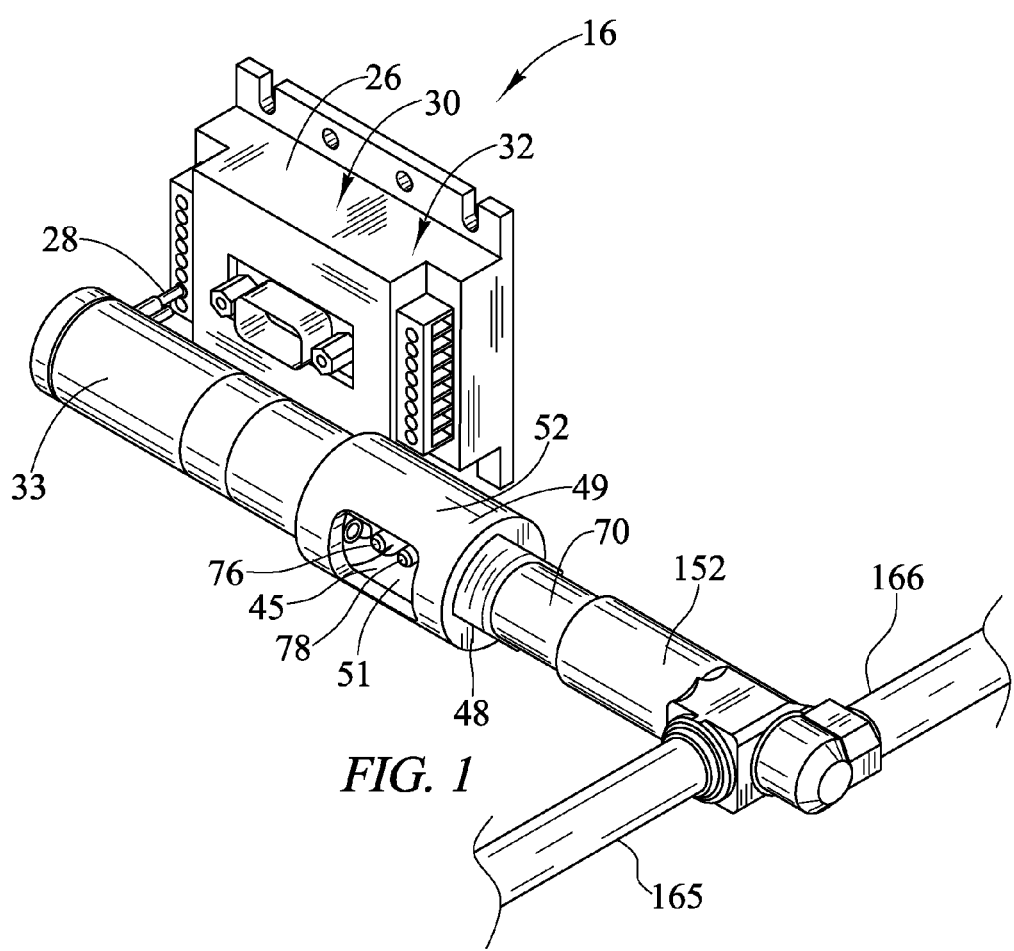
FIG. 1 is a front perspective view of the non-magnetic latching servo actuated valve.

FIGS. 4A and 4B show a generally cylindrical shaped mounting member 44 having a first end wall 46 adjacent to the gear head 38 and an opposed second end wall 48. As shown in FIGS. 1 and 2, a surrounding wall 49 extends between the opposed first and second end walls 46, 48, respectively, and has an interior surface 50 and an exterior surface 52. As shown in FIGS. 2 and 4A, the mounting member surrounding wall 49 has an access opening 45 that leads to the mounting member interior 51, and that provides access to a first set screw 76 and a second set screw 78. The mounting member first end wall 46 has a gear head opening 53 through which a portion of the gear head 38 extends, such that a portion of the gear head 38 is positioned in the mounting member interior 51. In addition, the second end wall 48 has an interior surface 54, an exterior surface 56 and a second end wall opening 57. A spacing member 92 having an integral O-ring support 58 is positioned in the second end wall opening 57, as shown in FIGS. 4A-4B. A lead screw opening 64 extends through the O-ring support 58 and the spacing member 92. The purpose of the spacing. member 92 and the O-ring support 58 will be described presently.

Proximal the first end wall 46, the mounting member 44 has an internal annular groove 60 formed in the interior surface 50 of the surrounding wall 49. The motor mount 42 is received in this annular groove 60, to thus join the motor mount 42 and mounting member 44. The second end wall 48 has a pair of screw openings 62 for receiving hex head screws 66. The hex head screws 66 connect the mounting member 44 to a valve housing 70, as will be described presently.

As shown in FIGS. 1 and 4A, the hex head screws 66 connect the mounting member 44 to a valve housing 70. Positioned internally of the mounting member 44 and the valve housing 70 is a lead screw 68. A coupler 74 connects the lead screw 68 to the load shaft 40 that extends from the gear head 38. In particular, the coupler 74 has a pair of openings such that the first set screw 76 passes through the coupler 74 and contacts the load shaft 40, and the second set screw 78 passes through the coupler 74 and contacts the lead screw 68. The coupler 74 thus serves as a link between the load shaft and lead screw 68, such that when the load shaft 40 rotates, the lead screw 68 is caused to rotate in the same direction. As will be described presently, the lead screw 68 is used for advancing and retracting a valve stem 106 to open and close the non-magnetic servo latch valve 16.

The lead screw 68 is provided with a coupler portion 80 that is received in the coupler 74. The coupler portion 80 extends from an elongate portion 82 of greater diameter, and the elongate portion 82 has a groove 84 that extends circumferentially around its periphery. The groove 84 is for receiving an E-ring 85. The elongate portion 82 extends to a thrust bearing portion 86 having a greater diameter than the elongate portion 82. The thrust bearing portion 86 extends to a threaded portion 88 having a thread 90, and the threaded portion 88 has a diameter less than that of the thrust bearing portion 86.

When the lead screw 68• is positioned in the mounting member 44, spacing member 92 and valve housing 70 and rotated clockwise or counterclockwise, the lead screw 68 advantageously does not move axially relative to the gear head 38. As shown in FIGS. 4A and 4B, the elongate portion 82 of the lead screw 68 is positioned in the lead screw opening 64 that extends through the O-ring support 58 and the spacing member 92. When the lead screw 68 is positioned in the lead screw opening 64, the spacing member 92 is held in place by the above described hex screws 66 and valve housing 70. The E-ring 85 is positioned in the lead screw groove 84 and the E-ring 85 abuts against the spacing member 92, as shown in FIGS. 4A and 4B, such that the lead screw 68 does not move axially when it is rotated.

The valve housing 70 has a base portion 94 to which the hex screws 66 are threaded. The valve housing 70 also has a hollow cylindrical portion 96 that extends from the base portion 94, and the base portion 94 has an enclosed surface 95 that is surrounded by the cylindrical portion 96. There is a annular rim 98 at the end of the cylindrical portion 96. Extending through the base portion 94 is a central opening 100 sized to receive the elongate portion 82 of the lead screw 68, such that when the lead screw 68 is positioned in the valve housing 70, the thrust bearing portion 86 is spaced from the enclosed surface 95 of valve housing base portion 94. A thrust bearing 102 is positioned between the valve housing enclosed surface 95 and the lead screw thrust bearing portion 86. In this configuration, the lead screw 68 can be advantageously rotated clockwise or counterclockwise, and~it will not move longitudinally in the non-magnetic servo actuated latch valve 16.

The lead screw threaded portion 88 has an external thread 90 that is received in an internally threaded portion 107 of a valve stem 106. As shown in FIGS. 4A and 4B, the valve stem 106 is sized such that it can be received inside the hollow cylindrical portion 96 of the valve housing 70. The valve stem 106 is integrally formed from the internally threaded valve stem portion 107 that extends to a cross drilled bore portion 108 that extends to a valve stem cap holding portion 110, such that the cross drilled portion 108 is positioned between the internally threaded portion 107 and cap holding portion 110.

The valve stem cap holding portion 110 is cylindrically shaped and has an opening 111 that leads to a valve stem cap recess 112 and ends at an internal valve stem cap wall 113 sized to receive a valve stem cap 122 therein in a manner to be described presently. The valve stem cap recess 112 is cylindrically shaped, and an internally protruding rim 116 surrounds the opening 111. The valve stem 106 has a passage 118 that extends through the internal valve stem cap wall 113 to the cross drilled bore portion 108. In one of the preferred embodiments, the valve stem cross drilled bore portion 108 has two passages, commonly designated by reference number 120, that can be substantially perpendicular to one another. In other embodiments, the number of passages 120 can be more or less. As shown in FIGS. 4A-4C, the passage 118 extends to the internally threaded portion 107. As will be described presently, the cross drilled bore portion 108 advantageously allows for fluid flow.

Mounted inside the valve stem cap holding portion recess 112 is a valve stem cap 122 having a valve stem cap passage 136 that leads to a conical shaped internal wall 134. The valve stem cap 122 has a hollow valve stem cap portion 124, and has an exterior surface 126 having an annular groove 128. The annular groove 128 extends to a cylindrical portion 130 of greater diameter than that of the hollow valve stem cap portion 124.

Positioned internally of the hollow valve stem cap portion 124 is a shuttle assembly or pressure relief device 138. The shuttle assembly 138 comprises a shell 30 component or element 140 that can have a recess, and the shell component 140 is, in one of the preferred embodiments, conical shaped and has a shuttle groove 141. A shuttle O-ring 143 is fitted into the shuttle groove 141. The O-ring 143 forms a fluid seal between upstream and downstream pressures when the non-magnetic servo actuated latch valve 16 is in the closed position shown in FIG. 4A, as will be described presently. The shuttle assembly 138 further comprises a spring 148 between the internal valve stem cap wall 113 and the shell component 140, which biases the shuttle component 140 into contact with the valve stem cap conical shaped wall 134, as shown in FIG. 4A. This results in the valve stem passage 136 being closed. The shuttle assembly 138 can advantageously be moved in a direction toward the cross drilled bore portion 108 to relieve downstream pressure build-up, such that built-up pressure is vented out the cross drilled bore portion 108 in a manner to be described presently.

As previously mentioned, the shuttle assembly 138 is subjected to both upstream and downstream pressures. On the upstream or inlet side of the non-magnetic latching servo actuated valve 16 there is a port system having passages 139 that allows the upstream reservoir pressure to force or act on the shuttle assembly 138. The upstream reservoir applies force in the direction of arrow U in FIG. 4A. On the other side of the shuttle assembly 138 is the downstream fluid which provides an opposing force on the shuttle assembly 138, and this pressure forces on the shuttle assembly 138 in the direction of arrow D. The rate and compression of the spring 148 is set such that a set pressure differential on the outlet side will cause the shuttle assembly 138 to move in the direction of arrow D, and thereby vent the excess downstream pressure until such point as the system is again in balance. After venting, the shuttle assembly 138 moves in the direction of arrow U until the O-ring 143 seats against the valve stem conical shaped wall 142. The shuttle assembly 138 is thus closed when the system is in balance, and opens in a response to a pressure differential between upstream and downstream pressures.

The valve portion further comprises a valve end cap 152 in which a portion of the valve housing 70, the valve stem 106 and the valve stem cap 122 are positioned. The valve end cap 152 is hollow and has a first end 154 and a second end 156. The first end 154 has an opening 155, and the end cap 152 has an interior surface 158. The end cap interior surface 158 has a first diameter portion 160 that extends from the first end 154 and extends to a groove 162 formed in the interior surface 158. The groove 162 is for engaging the annular rim 98 of the valve housing 70, to thus join the valve housing 70 and valve end cap 152.

The valve end cap 152 has a second diameter portion 164 having an internal diameter less than the internal diameter of the first diameter portion 160, as shown in FIG. 1. The interior surface 158 extends from the groove 162 to an inlet 165 and an outlet 166. The inlet 165 has a surrounding annular wall 168 to which a weld ring 170 is welded. The inlet 165 is fitted with filters 172 positioned between the weld ring 170 and valve end cap 152. The inlet 165 also has an opening 174 that allows for the flow of fluid there-through, and which leads to an interior 176 of the valve end cap 152. The outlet 166 faces in a direction opposite the inlet 165, and there is an opening 178 provided at the outlet 166 that leads to the interior of the valve end cap 152. A valve end cap passage 185, shown in FIG. 4B, extends through the valve end cap 152. As noted in FIG. 1, hoses can be coupled to the inlet 165 and outlet 166. Hoses of varying diameters can be utilized to change the flow rate within end cap 152.

The valve end cap interior surface 158 has an inclined sealing surface portion or valve seat 180 that is for engaging the valve stem cap convex curved surface 132. The flow of fluid cannot pass between the sealing surface portion 180 and the adjacent valve stem convex curved wall 132 when the non-magnetic latching servo actuated valve is in the closed position, indicated by reference number 182 in FIG. 4A. This is because the force applied by the lead screw 68 on the valve stem 106 prevents such flow, and because the lead screw 68 cannot move axially unless it is rotated by the motor 24 in the manner described above. The open position of the nonmagnetic latching servo actuated valve 16 is shown in FIG. 4B. When open, fluid flow from an upstream source, for example, a reservoir or fuel cell, moves through the inlet 165, through a valve end cap passage 185 which extends past the valve seat 180, and out the outlet 166, as shown by fluid flow arrows 133 in FIG. 4B.

In use, the servo drive/controller 26 controls the rotation of the motor 24 to open and close the valve portion 20. This is accomplished when the motor 24 turns the lead screw 68 to cause the valve stem 106 and valve cap 122 to move toward the valve seat 180 to close valve end cap passage 185 and the valve portion 20, as shown in FIG. 4A, and when the motor 20 turns the lead screw 68 to cause the valve stem 106 and valve cap 122 to move away from the valve seat 180 to open the valve end cap passage 185 and valve portion 20, as shown in FIG. 4B. Thus, under normal operation, the non-magnetic latching servo actuated valve 16 opens and closes as the lead screw 68 is rotated, which results in the valve stem cap convex curved surface 132 moving away from or toward the sealing surface portion or valve seat 180 of the valve end cap 152. The fluid can comprise rocket fuel, for example, hydrazine or other fuel known to those having ordinary skill in the art. In other embodiments, the fluid can be virtually any fluid.

In the closed state, valve cap 122 and valve seat 180 form a fluid tight seal. Ideally, the seal is tight enough to allow for minimal leakage (generally $1.0 \times 10^{-6}$ cubic centimeters per second or less) even in the presence of high pressures (generally up to approximately 4,800 psig). The valve can also be closed without experiencing waterhammer.

For purposes of illustration, in one of the preferred embodiments the upstream reservoir (not shown) contains rocket fuel. Fuel is delivered to the inlet 165 and passes through the filters 172, and moves out the outlet 166 and is delivered to a thruster bank (not shown) where it is burned. After the desired burn of fuel is complete, the non-magnetic latching servo actuated valve 16 closes, as shown in FIG. 4A. When the non-magnetic latching servo actuated valve 16 is in the closed position 182 shown in FIG. 4A, there is no flow of fluid through the non-magnetic latching servo actuated valve 16 from the inlet 165 to the outlet 166, because flow through the valve end cap passage 185 blocked by the valve cap 122 positioned in the valve end cap passage 185. However, when the satellite faces the sun, any fuel located in the fuel line between the thruster bank and the valve stem cap 122 can become very hot, which results in the rapid build up of pressure in the fuel line. This pressure can increase to thousands of pounds per square inch, for example, 4,000 p.s.i., and can result in damage to the fuel lines (not shown), the outlet tube (not shown), and the non-magnetic latching servo actuated valve 16. To prevent damage to the satellite (not shown), the built up pressure can be advantageously vented via the shuttle assembly 138 through the nonmagnetic latching servo actuated valve 16 in a direction from the outlet 166 toward the inlet 165 and reservoir. In other words, the non-magnetic latching servo actuated valve 16 advantageously can vent in a direction from the outlet 166 to the inlet 165.

When downstream pressures reach a predetermined pressure, for example 150 p.s.i., the pressurized fuel or fluid in the fuel line moves through the valve stem cap passage 136 and forces on the shuttle assembly shell element 140, which causes the spring 148 to compress, as shown in FIG. 4C. The pressurized fuel or fluid from downstream immediately begins moving through the outlet 166, thorough a portion of the valve end cap passage 185 and through the valve stem cap passage 136. The pressurized fuel or fluid can be a liquid, a gas, or a combination of both. This pressure relief flow is indicated by the arrows designated 137. The fluid forces on the shuttle assembly shell element 140, overcomes the force being applied on element 140 by the spring 148, and moves the shuttle assembly 138 in a direction toward the valve stem 106, which is indicated by arrow D in FIG. 4A. As this occurs, the downstream fluid begins flowing around the shell element 140, because the downstream pressure is greater than the reservoir pressure.

The fluid continues to flow until it reaches the valve stem cross drilled bore portion 108, at which point the fluid flows though the drilled bores or passages 120. From there, the fluid is free to flow into the pressure chamber 184 located within the valve housing 70. It is noted that an O-ring 186 is positioned between the valve housing 70, lead screw 68, and the mount O-ring support 58. The O-ring 186 advantageously prevents any fluid from reaching the gear head and motor 24 where it could cause damage. The fluid flows into the pressure chamber 184 and from there flows around the valve stem cap 122 and through a portion of the valve end cap passage 185 and through the inlet 165, and out the non-magnetic latching servo actuated valve 16 and back to the reservoir (not shown). The non-magnetic latching servo actuated valve 16 can advantageously relieve pressure build up in the fuel line without having to activate the motor to turn the lead screw 68 to move and open the valve stem cap 122. The shuttle assembly 138 advantageously conserves energy and provides for venting of pressure without activating a motor and without generating electromagnetic interference.

In addition, because this is a non-magnetic latching. servo actuated valve 16, there is not a normally open or closed position, because it can be built either way. However, in one of the preferred embodiments wherein the non-magnetic latching servo actuated valve is used in a satellite application, the non-magnetic latching servo actuated valve 16 operates the same as a normally open non-magnetic latching servo actuated valve 16.

For example, a signal is sent from the satellite to the non-magnetic latching servo actuated valve 16 indicating that the non-magnetic latching servo actuated valve 16 is to close. In one of the preferred embodiments, this is only a pulse signal and not a constant voltage source. The servo drive/controller 26 receives the signal which causes it to activate the electric motor 24, and the motor 24 begins to run clockwise advancing the valve stem 106 and valve stem cap 122 axially towards the sealing surface portion or seat 180 of the valve end cap 152. Since this is a servo system, the controller 26 is monitoring both the current load and the number of electric motor 24 shaft revolutions. Then, when the valve stem cap 122 contacts the valve end cap seat or sealing surface 180, the motor 24 stops attempting to drive the valve stem cap 122 further, and this creates pressure on the seal formed between the valve stem cap 122 and the valve end cap seat or sealing surface 180. As this is occurring, the current draw to the motor 24 increases. Then, at a preset current limit the motor 24 turns off and the nonmagnetic latching servo actuated valve 16 is closed. Current limiting is well known to those having ordinary skill in the art.

As the servo drive controller 26 counted the revolutions of the motor 24, the controller 26 can calculate the distance traveled by the valve stem cap 122, and then can retract the same distance to achieve the open position, shown in FIG. 4B. In addition, as the valve end cap seat 180 and the valve stem cap 122 wear over time, for example, as they repeatedly contact one another, the non-magnetic latching servo actuated valve 16 constantly adjusts for this different closing location. This advantageously allows the non-magnetic latching servo actuated valve 16 to form a reliable seal as time progress and the internal valve stem cap 122 and valve end cap seat 180 wear over time. This advantageously provides the non-magnetic latching servo actuated valve 16, and the satellite that it is incorporated in, an extended useful working lifespan.

Also, while not required for satellite applications, there are additional advantages of using the servo drive/controller 26 method of control. In particular, the servo drive/controller 26 allow for precise control of the position of the valve stem cap 122 relative to the valve end cap seat 180. Thus, the nonmagnetic latching servo actuated valve 16 could, in other preferred embodiments, be used as a pressure regulating device precisely controlled by the controller 26.

In addition, as this non-magnetic latching servo actuated valve 16 is precisely controlled by the controller 26, in another preferred embodiment it could also be used in conjunction with pressure transducers to allow the non-magnetic latching servo actuated valve 16 to work as a pressure regulator. It is noted that servo controllers are well known to those having ordinary skill in the art.

The non-magnetic latching. servo actuated valve 16 can comprise stainless steel so that it can withstand highly corrosive materials, for example, the hydrazine fuel which is frequently used in satellite applications. Also, the non-magnetic latching servo actuated valve 16 and its components can comprise other materials resistant to the corrosive materials and fuels, such materials being known to those having ordinary skill in the art.

Another preferred embodiment of the non-magnetic latching servo actuated valve 216, is shown in FIGS. 5-9A-9C. In this embodiment, clamps 200, 202, respectively, connect to clamp blocks 204, 206, respectively, to thus connect the electric package housing 208 to the electric motor 24 by screws 210. The screws 210 can be, for example, hex flange head screws. The electrical package housing 208 has a removable cover 212 for allowing access to the interior which houses the printed circuit board assembly 214. Printed circuit board 214 contains a microprocessor for executing the software detailed in FIGS. 12 and 13 and described more fully hereinafter. The other components of this embodiment are identical as the above-described first embodiment and therefore do not require further description.

Additional Embodiments

Figure 10:
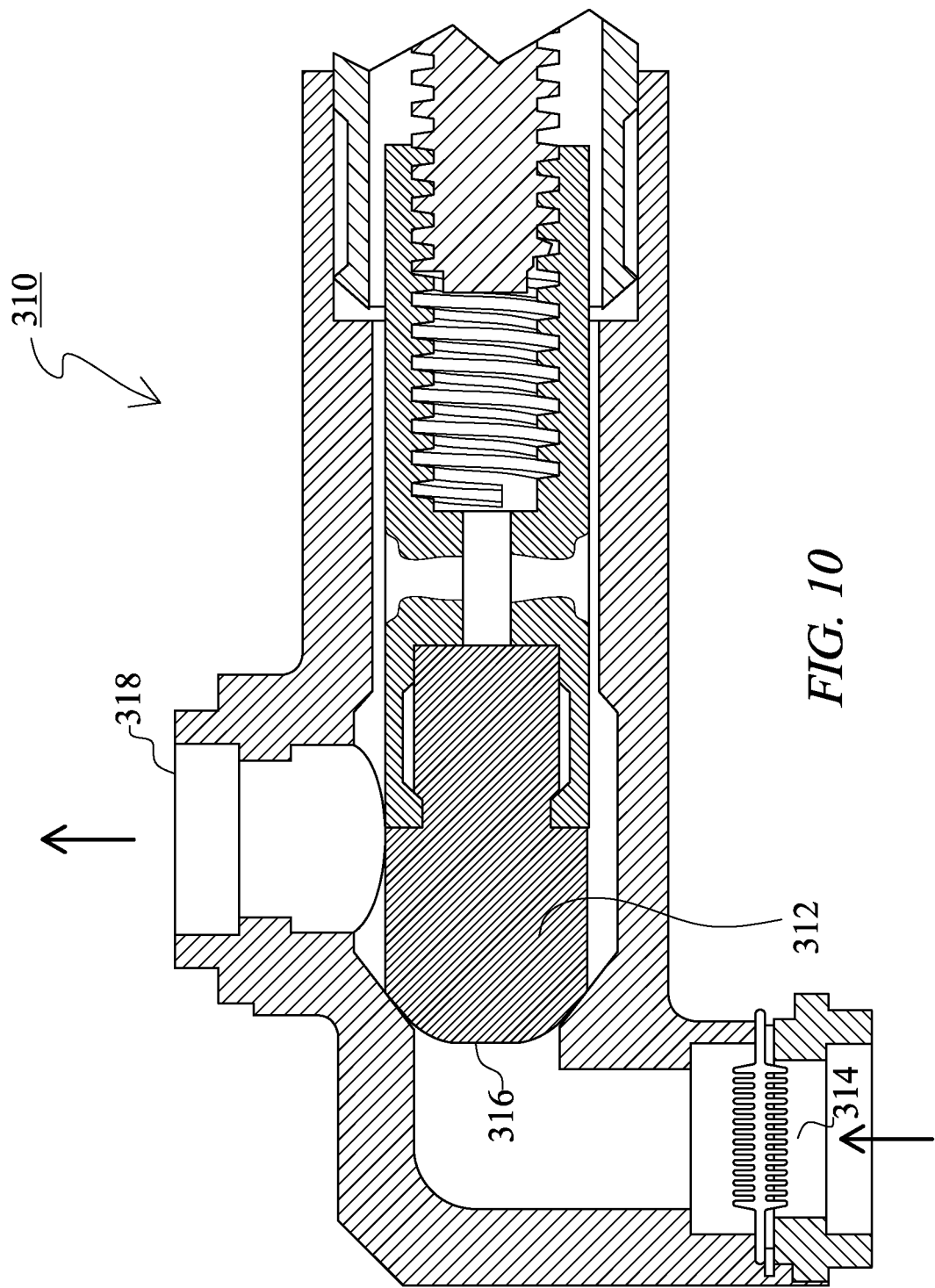
FIG. 10 is an alternative embodiment of the non-magnetic latching servo without a shuttle assembly or valve stem cap passage.
Figure 11:
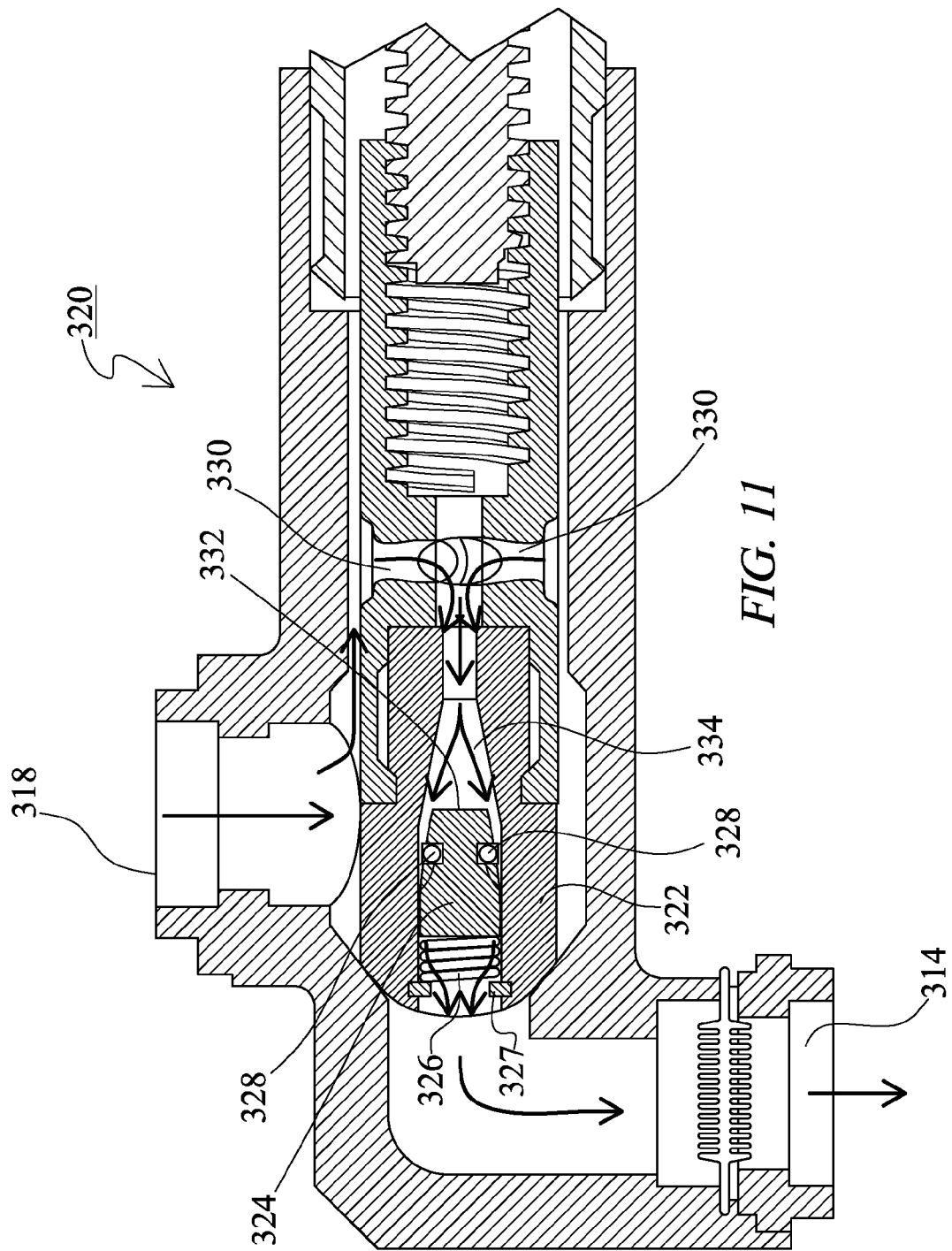
FIG. 11 is an additional alternative embodiment of the non-magnetic latching servo with fluid path that is opposite to the fluid path depicted in FIG. 9C.

Additional embodiments of the latching servo are depicted in FIGS. 10 and 11. These embodiments are similar in many respects to the latching servo depicted in FIGS. 1-9C, with similar reference numerals being used to designate similar parts. However, in these embodiments, the path of the working fluid is reversed, with the inlet and the outlet being switched.

The valve 310 of FIG. 10 includes an inlet 314 (with an associated filter) and an outlet 318. Unlike the prior embodiments, valve 310 also utilizes a solid valve stem cap 312. Accordingly, the shuttle assembly 138, shuttle 140, and valve stem cap passage 136 (note FIG. 9C) have been removed, thereby eliminating the ability to vent back pressures. Nonetheless, a more modulated flow is achieved by reversing the inlet 314 and outlet 318. As such, with valve 310 in the closed position, fluid traveling through the inlet 314 encounters the distal end 316 of valve stem cap 312. Conversely, with valve 310 in the opened position, valve stem cap 312 is unseated, such that the working fluid enters inlet 314, passes through the filter, travels over the distal end 316 of valve stem cap 312, and exits through the outlet 318. Reversing the fluid path in this manner promotes a more laminar flow over the surface of stem cap 312 with valve 310 in the opened position. Moreover, the reversed orientation permits stem cap 312 to withstand greater pressures when in the seated orientation.

The non-magnetic latching servo 320 of FIG. 11 employs the same fluid path as valve 310 (note FIG. 10); however, this embodiment permits back pressures to be vented via a shuttle assembly 322. Shuttle assembly 322 is oriented opposite to the shuttle assembly 138 depicted in FIGS. 1-9C. Yet, as with the primary embodiment, shuttle assembly 322 includes a tapered shell 324, a spring 326, and a radially positioned O-ring 328. A retaining ring 327 is preferably included to retain spring 326 within shell 324. When back pressure builds up within outlet 318, the working fluid enters the opposing bores of the valve stem 330 and contacts the exposed face 332 of shell component 324. After a sufficient backpressure is achieved, the force of spring 326 is overcome and shell component 324 is unseated. FIG. 11 illustrates the shell component 324 in the unseated position. The working fluid then enters the valve stem cap passage 334, travels around shell component 324 and exits through inlet 314. In this regard, a passageway is created between shell 324 and the interior of the stem cap when shell 324 is unseated. Shell component 324 is preferably tapered to promote a laminar, non-turbulent flow. Thus, the embodiment of FIG. 11 has all the advantages of the re-oriented flow of valve 310 but with the additional benefit of permitting back pressures to be alleviated via shuttle assembly 322.

Figure 12:
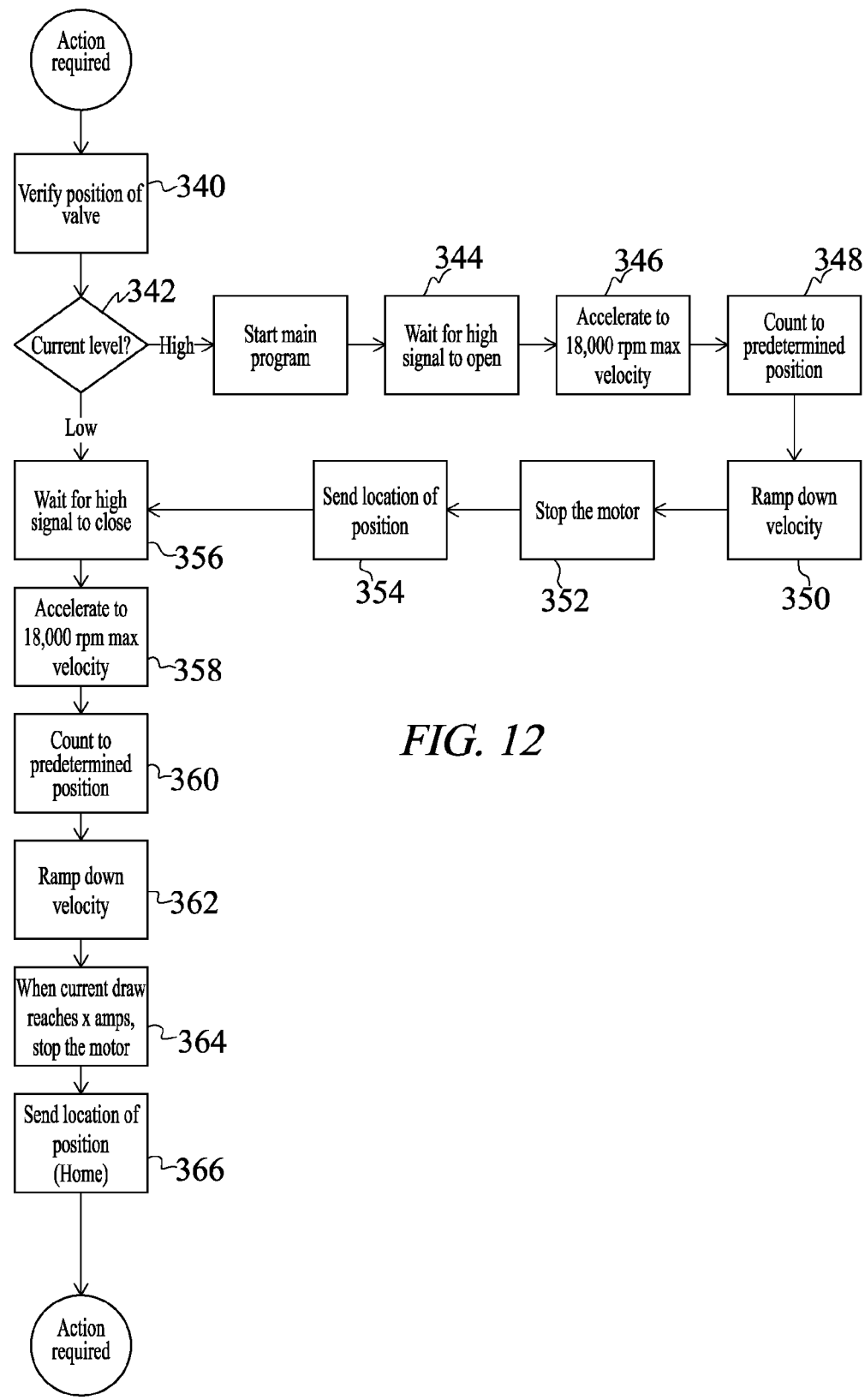
FIG. 12 is a flow chart illustrating a method for determining the position of the valve on the basis of current drawn on the motor.

FIG. 12 is a flow chart illustrating a method for determining the position of the latching servo valve. The method can be carried out in connection with any of the foregoing embodiments and is preferably implemented via a computer program and an associated microprocessor or microcontroller. The program can be written in any suitable programming language, such as Assembly, Basic, CAN, C+, Java, or Fortran. In one embodiment, the software is executed by a microprocessor that resides upon, or is physically interconnected with, the latching servo. For example, in the context of a spaced based application, the microprocessor can be on-board a satellite employing the latching servo. In such an embodiment, on-board sensors associated with the latching servo can provide the signals necessary to initiate or control the program with minimal or no human interaction. In yet another embodiment, the software is executed by a microprocessor or computer that is remote from the latching servo. For example, ground based human (or computer) operators can remotely provide control signals to the space based satellite as necessary to initiate or otherwise control the program. In still yet another embodiment, the software is controlled via a combination of an on-board and a remote controller.

Regardless of where the software is executed, it is employed in both ensuring that the valve is fully seated in the closed position and in reporting the valve position. For instance, in a space based environment, the software would inform ground based operators whether the valve is in the opened or closed orientation. In the first step 340, the program is initiated by requesting a verification of the valve position. This request may come from a remote monitoring station via a communications link, or it can be provided by an on-board sensor. When verification is requested, the motor drives the stem cap to the closed position.

In a preferred but non-limiting embodiment, the stem cap is driven closed by the motor at a velocity that is substantially slower than the normal closing velocity. For example, the stem cap can be closed by driving the motor and associated lead screw at approximately 8,000 RPM (although other velocities can be employed). Thereafter, at step 342, a determination is made whether the current draw on the motor is high or low. A high current draw reflects a closed state, while a low current draw reflects an opened state. Namely, activating the motor while the valve is closed will result in the motor experiencing high amperage. Alternatively, activating the motor while the valve is opened will result in the motor experiencing relatively lower amperage. In one particular embodiment, a low amperage is anything less than 400 mA, and a high amperage is anything greater than 400 mA.

If the valve is determined to be closed, at step 344 the program waits for a signal to open the valve. When the open signal is received, at step 346, the motor is accelerated to rotate lead screw and unseat valve stem cap. In one embodiment, the motor is rotated at approximately 18,000 RPM. An encoder can be used to count the revolutions of the lead screw and, thereby, determine the relative position of the stem cap. However, in the preferred embodiment, a hall effect sensor associated with the motor is used in lieu of an encoder to monitor the rotation of the motor and keep track of the corresponding linear position of the stem cap.

At step 348, the number of revolutions is counted and compared to a predetermined position. The predetermined position corresponds to a linear distance between the end of the stem cap and the valve seat. A suitable linear distance is chosen to ensure that the valve is fully opened. Once this predetermined position is achieved, the speed of the motor is reduced at step 350. Thereafter, the motor is stopped at step 352. This represents the opened position of the valve. This open state is then reported back to the operator at step 354.

Thereafter, the software waits until a closed signal is received at step 356. Once a signal is received to close the valve, at step 358, the motor is accelerated to a relatively high speed, such as 18,000 RPM. The motor is rotated in a sense to drive the lead screw and stem cap towards the valve seat. Again, an encoder or sensor is used to count the revolutions at step 360 and determine the relative position of the stem cap. Once a predetermined position is achieved, the motor is ramped down at step 362. Here, the predetermined position corresponds to a closed position (i.e. the stem cap forming a seal with the valve seat). However, because the stem cap and/or valve seat may wear, the ultimate seated position of the valve may change over time. As such, the closed position cannot be accurately determined simply by monitoring the revolutions of the motor and/or lead screw. Thus, at step 364, the current draw on the motor is monitored. When the current draw reaches a predetermined level, it will be assumed that the valve is closed. This is a reflection of the fact that after the valve is seated, the motor will continue to try to rotate the lead screw. This state will be reflected by increased amperage within the motor that can be detected and quantified by a current monitor. Finally, once the closed position is detected, the location is communicated to the operator at step 366. This communication may be carried out via a communications link to a remote operator, if necessary.

Figure 13:
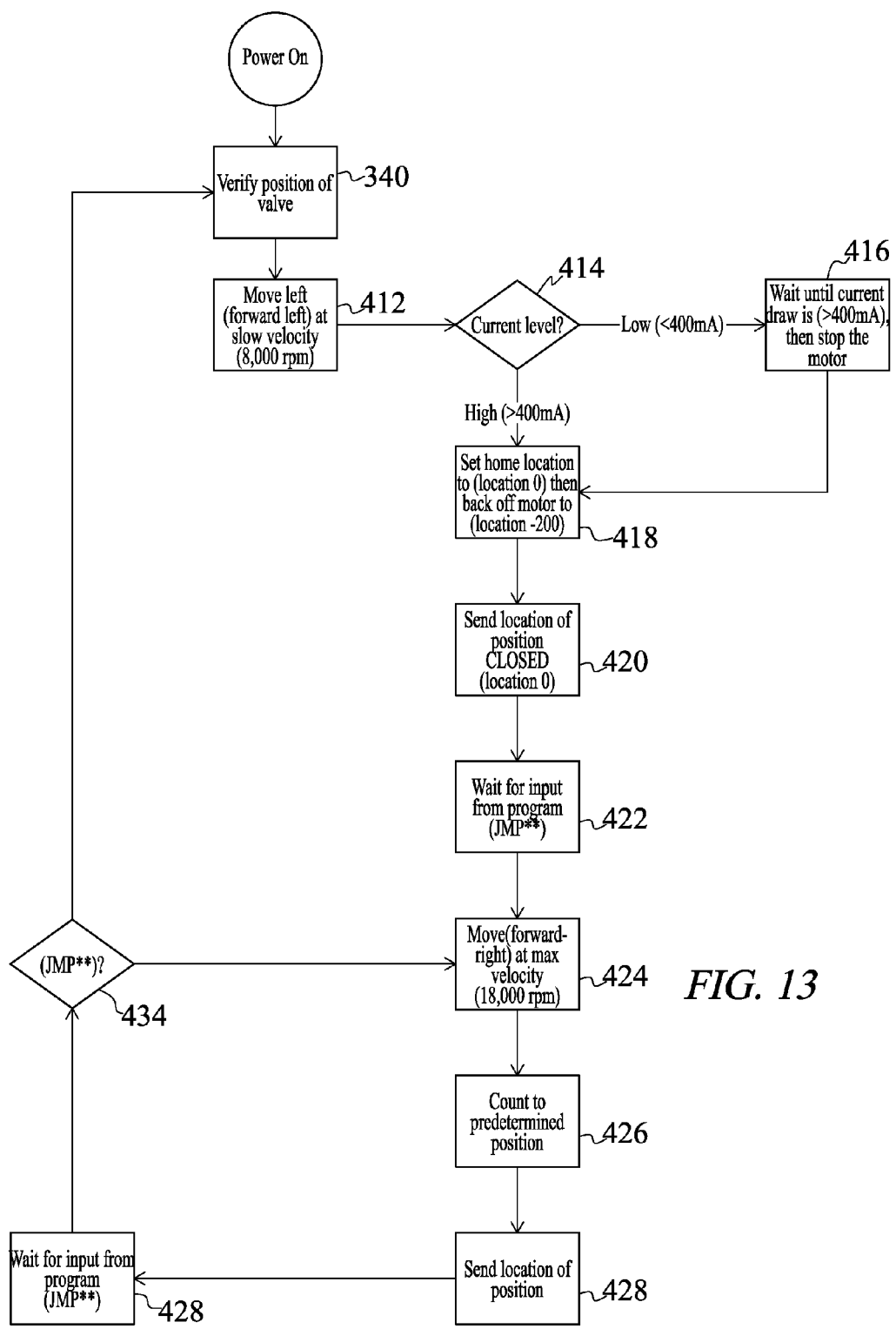
FIG. 13 is a flow chart illustrating a more specific method for determining the position of the valve on the basis of the current drawn on the motor.

An additional, and more specific, implementation of the program is depicted in FIG. 13. This version of the program can be run in the same environments as the program described above. However, this version allows for greater control by permitting a number of intermediate valve positions in addition to the fully opened and fully closed orientations.

At step 410, the program is initiated and the position of the valve is verified. At step 412, the motor moves the valve stem to the closed position at a relatively slow speed (for example, 8,000 RPM). Next, the current level of the motor is measured at step 414 to determine if the current level is high (greater than 400 mA) or low (less than 400 mA). If the level is low, it is determined that the valve stem is starting from an opened position. Thus, at step 416, the motor is thereafter continually rotated until a high current level is detected and the valve is determined to be closed. Next, at step 418, the motor can be reversed to back the valve stem from the valve seat by a small distance. This distance is ideally sufficient to maintain a tight seal but otherwise prevents the unintended sticking of the valve. Thereafter, the program waits for further input at step 422.

Specific input control can be provided at step 434. This control function allows a human or non-human operator to open the valve to any of a number of intermediate positions as well as to completely open or completely close the valve. The instructions are carried out at step 424. The rotation of the motor and lead screw are monitored at step 426 to determine the relative position of the stem cap relative to the valve seat. Depending upon the input provided at step 434, the stem cap can be stopped at any of a number of desired locations relative to the valve seat. The chosen location may depend, for example, on the desired flow rate through the valve. The ultimate location of the stem cap is then sent back to the microprocessor at step 428. Thereafter, the program can again be put into a holding pattern to await further instructions at step 432.

The specific valve constructions and associated control systems disclosed herein have been primarily described in connection with spaced based applications. The valve is well suited for space due to its light weight and minimal number of moving parts. The valve achieves this while also providing a tight seal with little or no leakage or out gassing and does so at extreme high and low temperatures. The disclosed motor controls are also fully compatible with existing spacecraft systems and materials. The configuration is also scalable to fit various flow requirements. The valve assembly can be exposed to a relatively large number of open/close cycles without experiencing seal degradation or otherwise malfunctioning. The assembly can also be maintained in either the opened or closed state without consuming power.

Although these features are well suited for space environments, it is understood that the specific embodiments disclosed can be used in any number of environments. The valve finds particular application in environments where it is desirable to minimize electro magnetic fields and/or provide precise flow rate control. These environments may include, for example, sea based applications such as nuclear powered submarines. It may also be desirable to employ the disclosed embodiments in connection with land based applications, such as power generation plants, and/or mineral ore, petroleum or liquefied petroleum gas (LPG) processing plants. Those of ordinary skill in the art will be familiar with still yet other applications for the present invention.

It will be appreciated by those skilled in the art that while a non-magnetic latching servo actuated valve invention has been described above in connection with particular embodiments and examples, the invention is not necessarily so limited and other embodiments, examples, uses, and modifications and departures from the described embodiments, examples, and uses may be made without departing from the valve of this, invention. All of these embodiments are intended to be within the scope and spirit of the present invention.

What is claimed:

1. A method for determining the state of a valve assembly, the valve assembly including a stem cap with opened and closed positions relative to a valve seat, the stem cap being movable between the opened and closed positions by way of a motor, the motor rotating and drawing a current when operated, the valve assembly including a spring biased and conically shaped shuttle that is positioned within a stem cap passage within the stem cap, the shuttle having opened and closed positions, the method comprising the following steps:

sending a signal to verify the initial position of the stem cap, the signal actuating the motor to move the stem cap into the closed position;

monitoring the current draw of the motor and determining whether the current draw is high or low, with a high current draw reflecting an initially closed position and a low current draw reflecting an initially opened position;

signaling either the initially closed or the initially opened position of the stem cap;

sending a signal to close the stem cap when the stem cap is in the initially opened position, the signal activating the motor to move the stem cap into the closed position;

monitoring the current draw of the motor and stopping the motor when the current draw reaches a pre-determined threshold, the pre-determined threshold reflecting the closed state;

signaling the closed state of the stem cap;

relieving any back pressure when the stem cap is in the closed position by opening the conically shaped shuttle against the spring bias.

2. The method as described in claim 1 comprising the further step of:

monitoring the rotation of the motor after sending the signal to close the stem cap; and determining on the basis of the rotation of the motor an initial position of the stem cap.

3. The method as described in claim 2 wherein the motor is slowed after the position of the stem cap reaches a pre-determined position.

4. The method as described in claim 1 comprising the further step of:

waiting for a signal to open the valve stem if the initial position is determined to be closed.

5. A method for positioning a motor operated valve assembly, the motor drawing a current, the valve assembly including an internal, spring biased shuttle, the method comprising the following steps:

sending a signal to verify an initial position of the valve, the signal actuating the motor to move the valve into a closed position;

monitoring the current draw of the motor and determining whether the current draw is high or low, with a high current draw reflecting an initially closed position and a low current draw reflecting an initially opened position;

sending a signal to close the valve when the valve is in the initially opened position, the signal activating the motor to move the valve into the closed position;

monitoring the current draw of the motor and stopping the motor when the current draw reaches a pre-determined threshold, the pre-determined threshold reflecting the closed state;

venting any back pressure within the valve assembly through the internal shuttle when the valve is in a closed position.

* * * * *